United States Patent [19]

Handy et al.

[11] Patent Number: 4,788,629
[45] Date of Patent: Nov. 29, 1988

[54] INSTRUMENT PANEL MEMBERS

[75] Inventors: Charles R. Handy, Wilder; Dwight H. Brattain, Quechee, both of Vt.; David L. Sousa, Enfield, N.H.

[73] Assignee: Loctite Luminescent Systems, Inc., Lebanon, N.H.

[21] Appl. No.: 924,580

[22] Filed: Oct. 29, 1986

[51] Int. Cl.$^4$ .............................................. F21V 9/16
[52] U.S. Cl. ......................................... 362/23; 362/84
[58] Field of Search ..................... 362/84, 23, 27, 28

[56] References Cited

U.S. PATENT DOCUMENTS

| | | | |
|---|---|---|---|
| 3,395,058 | 7/1968 | Kennedy | 313/512 |
| 4,104,555 | 8/1978 | Fleming | 313/512 |
| 4,159,559 | 7/1979 | Robinson | 29/25.14 |
| 4,238,793 | 12/1980 | Hochstrate | 315/169.3 |
| 4,443,832 | 4/1984 | Kanamori et al. | 362/80 |
| 4,513,023 | 4/1985 | Wary | 313/503 |
| 4,560,902 | 12/1985 | Kardon | 313/509 |
| 4,593,228 | 6/1986 | Albrechtson et al. | 313/512 |
| 4,619,624 | 10/1986 | Kerr et al. | 445/22 |
| 4,647,337 | 3/1987 | Simpoulos et al. | 313/512 |

Primary Examiner—Charles J. Myhre
Assistant Examiner—David A. Okonsky
Attorney, Agent, or Firm—Robert F. O'Connell

[57] ABSTRACT

An instrument panel member comprising a multiple-ply back sheet of fiberglas reinforced material impregnated with a polyester resin, a multiple-ply front sheet of the same material and one or more electroluminescent (EL) lamp elements positioned therebetween. The overall structure is cured at a temperature and pressure selected to provide adequate curing without damage to the EL lamp elements and so as to minimize warpage of the final structure. The thickness of the back sheet is selected to accommodate the dimensions of the EL lamps and any electrical connectors used therewith while the thickness of the front sheet is normally much less and need only be such as to permit light from the EL lamps to be seen therethrough.

5 Claims, 1 Drawing Sheet

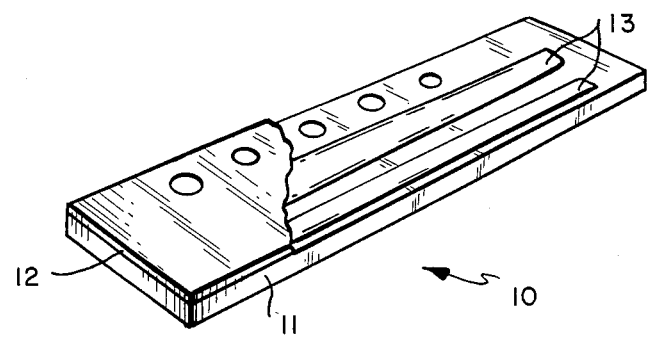

INSTRUMENT PANEL MEMBERS

INTRODUCTION

This invention relates generally to instrument panels and, more particularly, to uniquely constructed panel members using electroluminescent lamps for use in instrument panels such as those, for example, in aircraft cockpits.

BACKGROUND OF THE INVENTION

Current instrument panels, such as are used by pilots in the cockpit of an aircraft, for example, normally provide indicators which are often illuminated by incandenscent lights which are bulky and must often be replaced. In an effort to avoid the use of incandescent bulbs, panel members have been suggested which are illuminated by electroluminescent (EL) lamps. The EL lamps are encased between two plexiglass sheets which are bonded together substantially around the edges of the EL lamps themselves. However, such structures are subject to mechanical failure due to cracking or other breakage problems as well as to bond line failures. Failure at the mounting hole locations for the panel member, for example, has often required the use of crush-proof grommets. Moreover, oversized or elongated mounting holes are normally required in order to accommodate the high coefficient of expansion of plexiglass material relative to that of the EL lamps themselves and to the mounting rack to which the panel members are attached, which mounting rack is often made of aluminum.

In order to provide adequate mechanical strength to avoid such problems, the plexiglass sheets are usually made relatively thick so as to be able to withstand the stresses which give rise to breakage problems. Moreover, under severe environmental conditions (i.e., high temperature, high vibrations and the like) the bonding maerial used to bond the plexiglass sheets together at the edges of the lamp elements tends to lose its effectiveness and the plexiglass sheets begin to separate so that the mechanical integriity of the overall panel member is lost.

It is desirable, therefore, to provide panel members which can use EL lamps and which can maintain its structural integrity over time, while at the same time reducing the panel thickness usually required and, hence, the weight and cost of the overall panel structure. Further, it is desirable that such panele members be capable of being molded into various contours as may be desired in a particular application, without subsequent warpage during use.

BRIEF SUMMARY OF THE INVENTION

In accordance with the invention, an instrument panel member is fabricated by laminating multiple-ply fiberglas reinforced plastic sheets in a manner such as to enclose one or more EL lamp elements therebetween, the EL lamp elements being specially prepared for bonding under appropriate heat and pressure conditions. The fiberlas material can be molded into relatively thin contours such that the back fiberglas sheet has a thickness which need only provide adequate mechanical strength when mounted in an instrument panel and the front fiberglas sheet has a thickness which need only permit the light from the EL lamps to pass therethrough. For such purposes the overall thickness of the panel member will be primarily dependent upon the size of the electrical connectors which are used to provide electrical contacts to the EL lamps.

Such a structure is relatively light in weight and at the same time has relatively high compressive strength.

Morover, the coefficient of expansion of the fiberglas material is substantially close to that of both the EL lap elements and the aluminum panel to which the panel member is to be attached, which aluminum material is used in many instrument panel structures. Accordingly, such panel member does not require the use of crush-proof grommets or the use of oversized or elongated mounting holes.

DESCRIPTION OF THE INVENTION

The invention can be described in more detail with the help of the accompanying drawing wherein the sole FIGURE depicts a perspective drawing of an exemplary embodiment of a panel member in accordance with the invention.

As can be seen in the FIGURE, a panel member 10 comprises a first multiple-ply backing sheet 11 of fiberglas reinforced plastic and a front multiple-ply sheet 12 also of the same fiberglas reinforced plastic material. One or more EL lamps 13 are positioned between fiberglas sheets 11 and 12 in suitable recesses in the backing sheet 11.

Such fiberglas sheets are readily available to those in the art and are a particularly useful type of fiberglas material is a multiple-ply fiberglas sheet sold by the Composition Division of Ferro Corporation of Norwalk, Conn., one particular example of which is a prepreg, fiberglas material sold under the designation H200C. The plies thereof have a relatively standard thickness of 0.01 inches and under suitably selected heat and pressure conditions the impregnated polyester resin flows within and to the surfaces of the fiberglas material.

The EL lamps may be of any suitable type such as those depicted, for example, in U.S. Pat. No. 4,104,555, issued to G. R. Fleming on Aug. 1, 1978. the lamp elements are specially prepared for bonding by using a surface coating of a suitable film material, such as an acrylic film sold under the designation "KORAD" by Korad, Inc. of Newark, N.J., as mentioned in such patent.

The lamination of such fiberglas sheets with the EL lamps encased therebetween can then be bonded by utilizing well-known autoclave techniques wherein the overall structure is subject to controlled temperature and pressure conditions for producing a suitable bond. The temperature and pressure conditions must be selected so as to provide a sufficiently high temperature and pressure to cause the polyester resin within the fiberglas material to flow through the material and to the contacting surfaces thereof so as to produce a good bond between the sheets but not so high as to damage the El lamp structures. Moreover, it has been found that such temperature and pressure conditions must be carefully selected to avoid subsequent warpage of the panel member during use, a particularly critical problem where flat surfaces thereof are required.

In accordance therewith it has been found that temperatures within a range from 210° F. to 275° F., and preferably temperatures near the lower end of such range at or about 210° F., and pressures within a range from 50 p.s.i. to 135 p.s.i., and preferably within the range from 50 p.s.i. to 80 p.s.i. produce a panel member that provides a good bond without damage to the EL lamp elements and is not subject to undesired warpage during use. The exact temperature and pressure can be selected empirically depending on the particular panel member configuration which is required.

The overall structure is then suitably cooled and one or more mounting holes 14 can then be drilled therein for mounting the panel member to an appropriate surface of an overall aircraft instrument panel. A pair of electrical leads attached to each of the EL lamp structures can be made available at the backing member via appropriate and well-known electrical connector members (not shown) inserted at suitable through-holes in backing sheet 11.

In a particular embodiment of the panel member shown, for example, the fiberglas backing sheet may be, at a minimum, a 3-ply structure sheet while the front sheet may be, at most, a 2-ply or a 3-ply sheet structure which is thereby sufficiently thin to permit the light from the EL lamps to penetrate therethrough for viewing.

In some applicatitons where a particular color is required to be seen, a filter sheet element of any well-known type for permitting only a desired color to pass therethrough can be inserted between the EL lamp structures and the front sheet 12. Any well-known commercial plastic filer readily available to those in the art can be used for that purpose. When using a filter member the characteristics thereof must be taken into account when selecting the desired temperature and pressure values for use in the autoclave curing operation so as not to damage the filter material.

The fiberglas material used for sheets 11 and 12 has a coefficient of thermal expansion which is substantially the same as that of the EL lamps and as that of the panel mounting material, e.g., aluminum, so that during use any temperature changes will not induce cracking or other damage, since the fiberglas material will expand and contract at the same rate as such panel material and the lamps therein.

What is claimed is:

1. An instrument panel member comprising
   a first multiple-ply fiberglas reinforced plastic sheet pre-impregnated with a bonding resin and having a first selected thickness;
   one or more electroluminescent lamp elements positioned in one or more recesses of said first sheet;
   a second multiple-ply fiberglas reinforced plastic sheet pre-impregnated with a bonding resin and having a second thickness which is substantially less than that of said first selected thickness positioned in contact with said first fiberglas reinforced plastic sheet and the electroluminescent lamp elements positioned therein; and
   said first sheet, said second sheet and said one or more electroluminescent lamp elements being bonded together by curing at a temperature selected within a range from about 210° F. to about 275° F. and a pressure selected within a range from about 50 p.s.i. to about 135 p.s.i. and by subsequent cooling thereof.

2. An instrument panel member in accordance with claim 1 wherein said first and second fiberglas reinforced plastic sheets are made of fiberglas material which is pre-impregnated with a polyester resin.

3. An instrument panel member in accordance with claim 1 wherein said first sheet is formed of a pluralaity of at least three plies of fiberglas reinforced plastic material, the number of plies being selected to provide a thickness sufficient to match the thickness of said electroluminescent lamp elements and any electrical connecting elements attached thereto.

4. An instrument panel member in accordance with claim 1 wherein said second sheet has no more than three plies of fiberglas renforced plastic material so as to provide a thickness less than that of said first sheet such that the illumination of said one or more electroluminescent lamp elements can be seen therethrough.

5. An instrument panel member in accordance with claim 1 wherein said temperature is selected as about 210° F. and said pressure is selected within a range from about 50 p.s.i. to about 80 p.s.i.

* * * * *